(12) United States Patent
Grigg et al.

(10) Patent No.: US 8,925,804 B2
(45) Date of Patent: Jan. 6, 2015

(54) PRE-SET READABLE INDICIA FOR VENDOR USE

(75) Inventors: David M. Grigg, Rock Hill, SC (US); Alicia C. Jones, Fort Mill, SC (US); Glenn Grossman, Matthews, NC (US); Matthew A. Calman, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 232 days.

(21) Appl. No.: 13/586,231

(22) Filed: Aug. 15, 2012

(65) Prior Publication Data

US 2014/0048595 A1 Feb. 20, 2014

(51) Int. Cl.
*G06K 5/00* (2006.01)

(52) U.S. Cl.
USPC ............................................ 235/380; 235/383

(58) Field of Classification Search
USPC .................... 235/380, 383; 705/14.23, 14.38
See application file for complete search history.

(56) References Cited

U.S. PATENT DOCUMENTS

| 8,494,958 | B2 * | 7/2013 | Schoenberg et al. | 705/40 |
| 8,600,883 | B2 * | 12/2013 | Wong | 705/39 |
| 2011/0119156 | A1 | 5/2011 | Hwang | |
| 2013/0024379 | A1 * | 1/2013 | Di Tucci et al. | 705/44 |
| 2013/0097034 | A1 * | 4/2013 | Royyuru et al. | 705/17 |
| 2013/0238503 | A1 * | 9/2013 | Patel | 705/44 |

OTHER PUBLICATIONS

Van Grove, Jennifer. "SCVNGR Unveils QR Code Payment System." Mashable.com. http://mashable.com/2011/10/12/sevngr-levelup-redo/. 14 pages. Retrieved Nov. 15, 2012.
BeQRious. "Sweden's Seamless Unveils QR Code-Based Mobile Payment Solution." BeQRious.com. http://beqrious.com/sweden-s-seamless-unveils-qr-code-based-mobile-payment-solution/. 3 pages. Retrieved Nov. 15, 2012.

* cited by examiner

*Primary Examiner* — Ahshik Kim
(74) *Attorney, Agent, or Firm* — Michael A. Springs; Moore and Van Allen, PLLC; Patrick B. Horne

(57) ABSTRACT

Embodiments of the invention are directed to systems, methods and computer program products for processing a pre-set readable indicia associated with a user. The invention reads the pre-set readable indicia from a mobile device of the user, where the pre-set readable indicia comprises payment information, stores the read pre-set readable indicia or payment information extracted from the pre-set readable indicia, and, after connecting to a network, reconciles the transaction based on the payment information extracted from the pre-set readable indicia. In some embodiments, the invention receives authentication credentials from the user and authenticates the user to approve payment using the payment information from the pre-set readable indicia.

18 Claims, 5 Drawing Sheets

PRE-SET READABLE INDICIA FOR VENDOR USE

BACKGROUND

In some circumstances either one or both a user carrying a mobile device and a merchant may not have network connectivity. In some cases, performing a transaction, such as a purchase transaction, may be difficult or impossible because no immediate reconciliation is available.

BRIEF SUMMARY

Embodiments of the invention are directed to systems, methods and computer program products for processing a pre-set readable indicia associated with a user.

According to some embodiments, an apparatus, the apparatus includes a memory; a processor; and a computing module stored in the memory, executable by the processor, and configured to cause the processor to read the pre-set readable indicia from a mobile device of the user, where the pre-set readable indicia comprises payment information; store the read pre-set readable indicia or payment information extracted from the pre-set readable indicia; and after connecting to a network, reconciling the transaction based on the payment information extracted from the pre-set readable indicia.

In some embodiments, the readable indicia comprises a Quick Response (QR) code. In some embodiments, the computing module is further configured to cause the processor to read two or more pre-set readable indicia from a plurality of mobile devices of a plurality of users; store the two or more pre-set readable indicia or payment information extracted from the two or more readable indicia; and after connecting to the network, reconciling each transaction associated with the two or more pre-set readable indicia based on the time the transaction was initiated. In some embodiments, the computing module is further configured to cause the processor to establish a connection between the apparatus and a server maintained by a financial institution associated with the payment information; and facilitate, via the connection, reconciliation of the transaction with the financial institution. In some embodiments, the apparatus has limited or no network connectivity, and the storing is performed in response to determining that the apparatus has limited or no network connectivity. In some embodiments, storing is performed in response to determining that a number of transactions being performed reaches a predetermined threshold such that a backlog of transactions waiting for reconciliation may occur. In some embodiments, the pre-set readable indicia comprises payment information; and wherein the computing module is further configured to cause the processor to receive authentication credentials from the user; and authenticate the user to approve payment using the payment information from the pre-set readable indicia.

According to embodiments of the invention, a method for processing a pre-set readable indicia associated with a user associated with a transaction between the user and a merchant includes providing a processor of an apparatus, the processor for executing computer program code stored in a non-transitory computer-readable medium to cause the processor to read the pre-set readable indicia from a mobile device of the user, where the pre-set readable indicia comprises payment information; store the read pre-set readable indicia or payment information extracted from the pre-set readable indicia; and, after connecting to a network, reconciling the transaction based on the payment information extracted from the pre-set readable indicia.

In some embodiments, the readable indicia comprises a Quick Response (QR) code. In some embodiments, the computing module is further configured to cause the processor to read two or more pre-set readable indicia from a plurality of mobile devices of a plurality of users; store the two or more pre-set readable indicia or payment information extracted from the two or more readable indicia; and, after connecting to the network, reconciling each transaction associated with the two or more pre-set readable indicia based on the time the transaction was initiated. In some embodiments, the computing module is further configured to cause the processor to establish a connection between the apparatus and a server maintained by a financial institution associated with the payment information; and facilitate, via the connection, reconciliation of the transaction with the financial institution. In some embodiments, the apparatus has limited or no network connectivity, and the storing is performed in response to determining that the apparatus has limited or no network connectivity. In some embodiments, the storing is performed in response to determining that a number of transactions being performed reaches a predetermined threshold such that a backlog of transactions waiting for reconciliation may occur. In some embodiments, the pre-set readable indicia comprises payment information; and wherein the computer program code is further configured to cause the processor to receive authentication credentials from the user; and authenticate the user to approve payment using the payment information from the pre-set readable indicia.

According to embodiments of the invention, a computer program product for processing a pre-set readable indicia associated with a user associated with a transaction between the user and a merchant includes a non-transitory computer-readable medium comprising a set of codes for causing a computer to read the pre-set readable indicia from a mobile device of the user, where the pre-set readable indicia comprises payment information; store the read pre-set readable indicia or payment information extracted from the pre-set readable indicia; and, after connecting to a network, reconciling the transaction based on the payment information extracted from the pre-set readable indicia.

In some embodiments, the readable indicia comprises a Quick Response (QR) code. In some embodiments, the computer program code is further configured to cause the processor to read two or more pre-set readable indicia from a plurality of mobile devices of a plurality of users; store the two or more pre-set readable indicia or payment information extracted from the two or more readable indicia; and after connecting to the network, reconciling each transaction associated with the two or more pre-set readable indicia based on the time the transaction was initiated. In some embodiments, the computer program code is further configured to cause the processor to establish a connection between the computer and a server maintained by a financial institution associated with the payment information; and facilitate, via the connection, reconciliation of the transaction with the financial institution. In some embodiments, the computer has limited or no network connectivity, and the storing is performed in response to determining that the computer has limited or no network connectivity. In some embodiments, the storing is performed in response to determining that a number of transactions being performed reaches a predetermined threshold such that a backlog of transactions waiting for reconciliation may occur. In some embodiments, the pre-set readable indicia comprises payment account information; and wherein the computing module is further configured to cause the processor to receive authentication credentials from the user; and authenticate the user to approve payment using the payment information from the pre-set readable indicia.

BRIEF DESCRIPTION OF THE DRAWINGS

Figure 1:
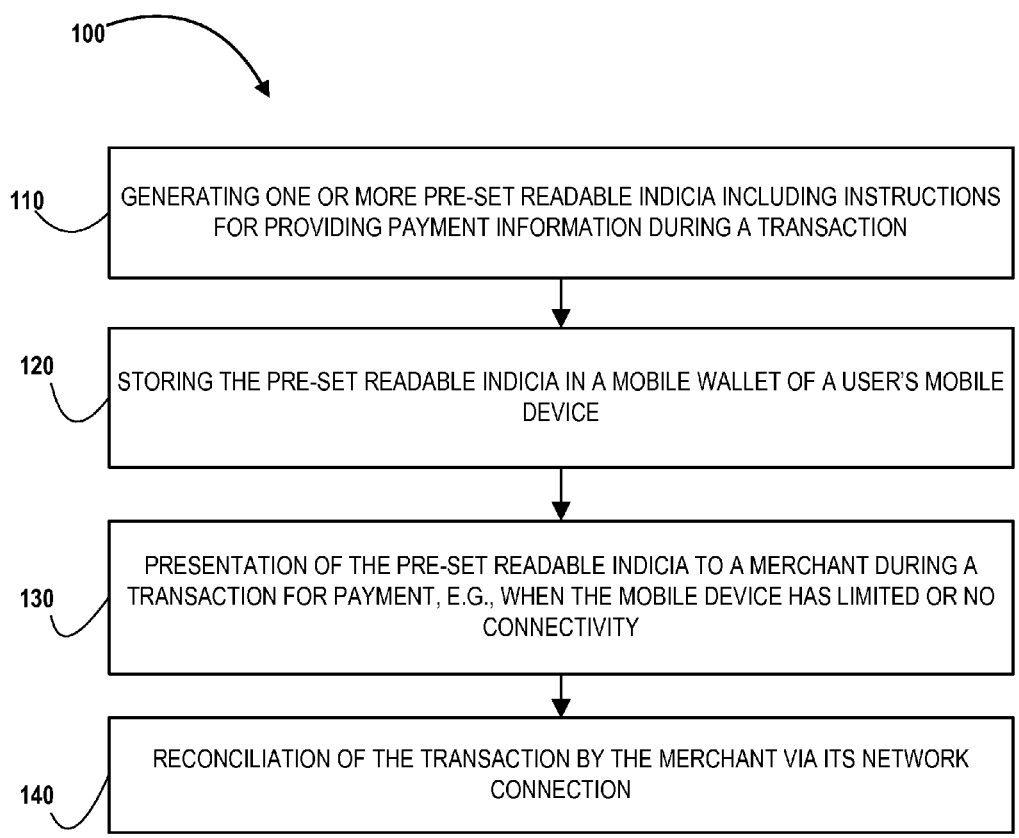
Figure 2:
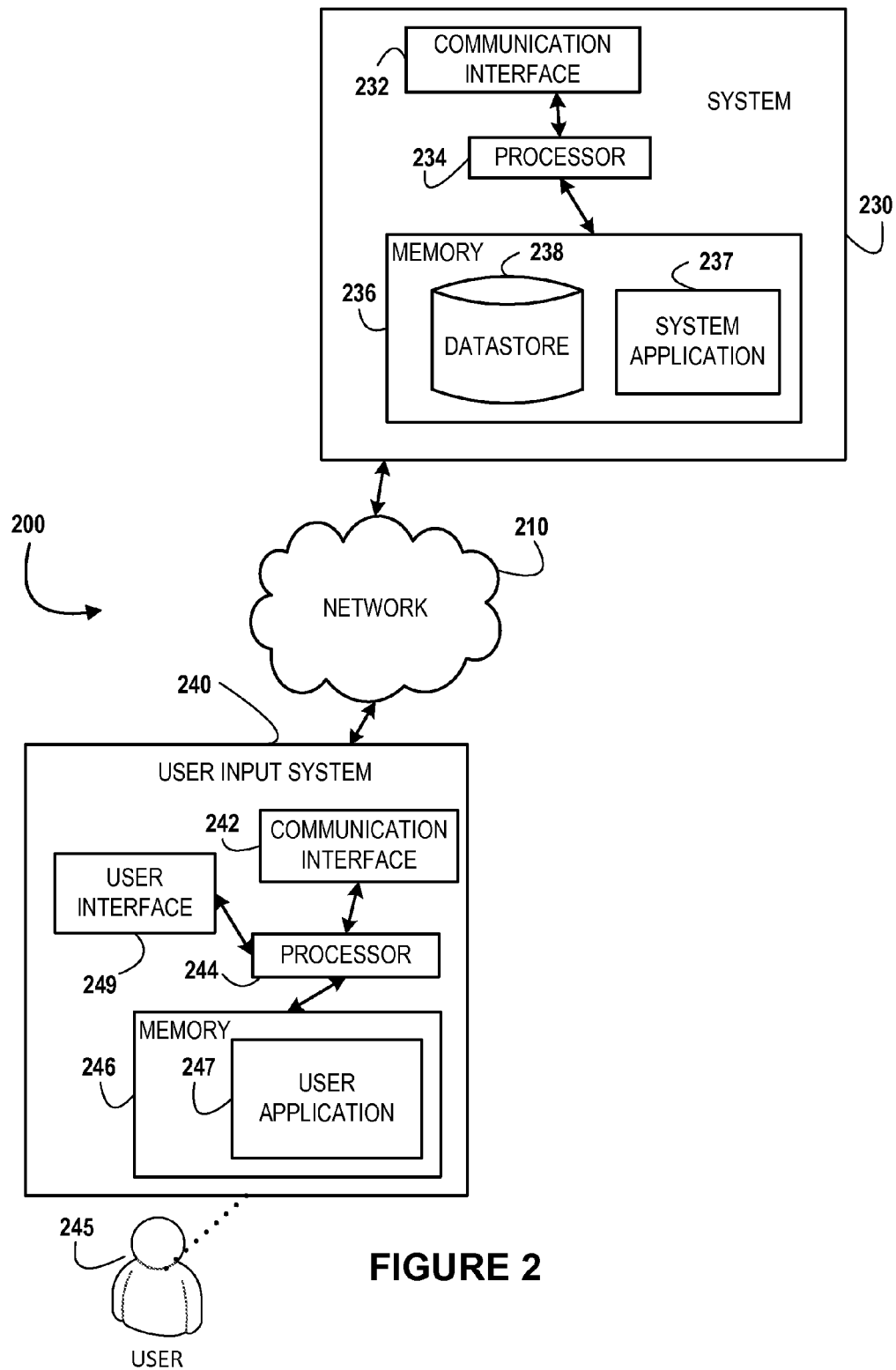
Figure 3:
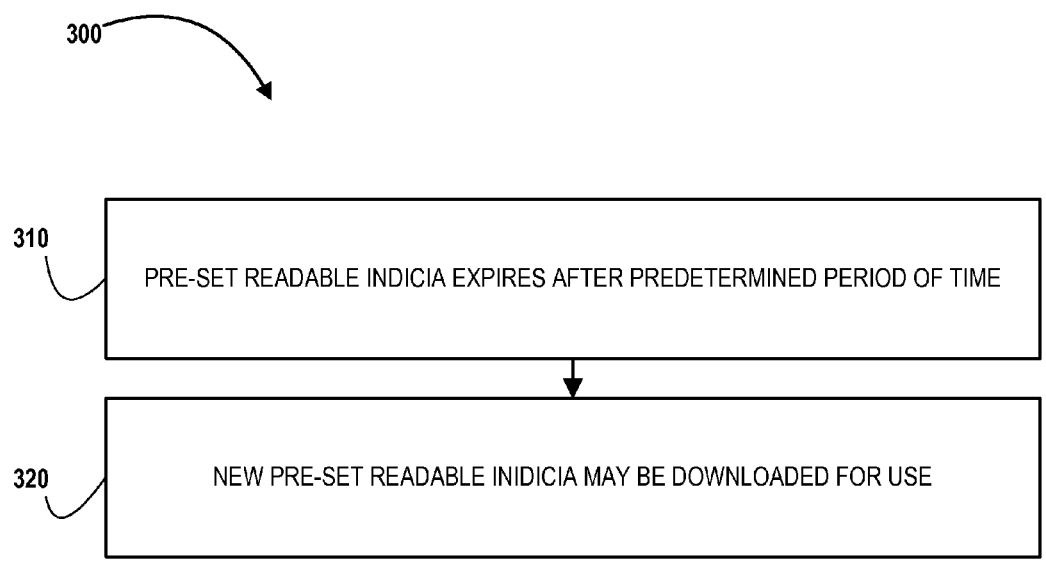
Figure 4:
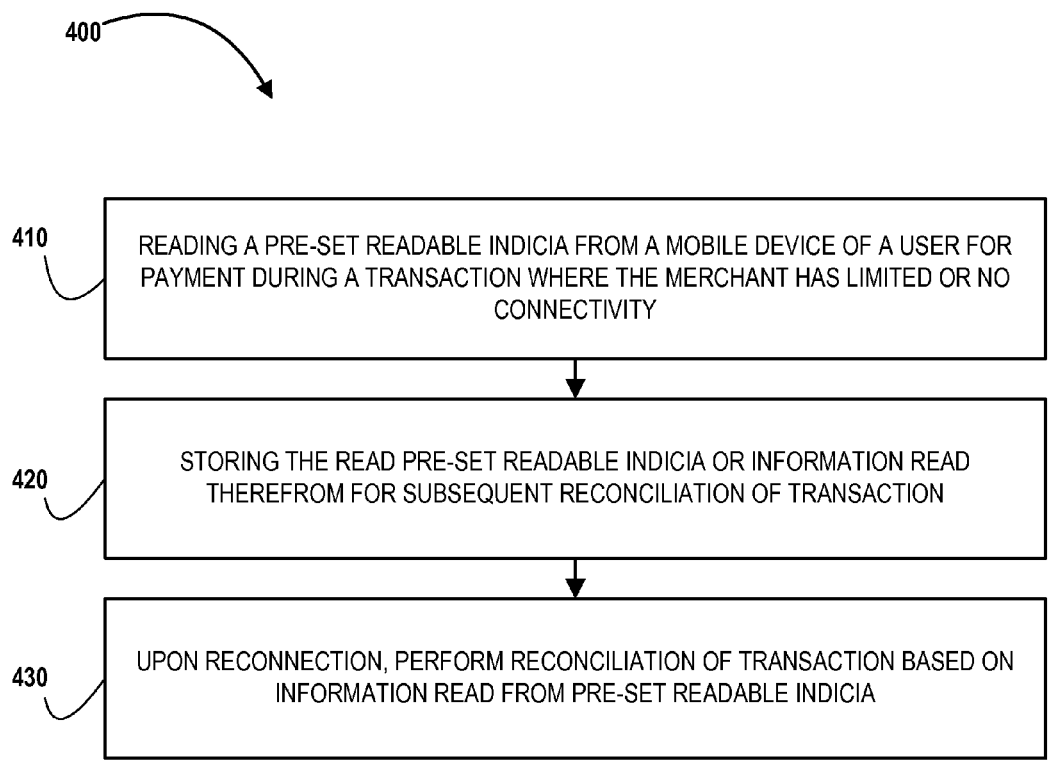
Figure 5:
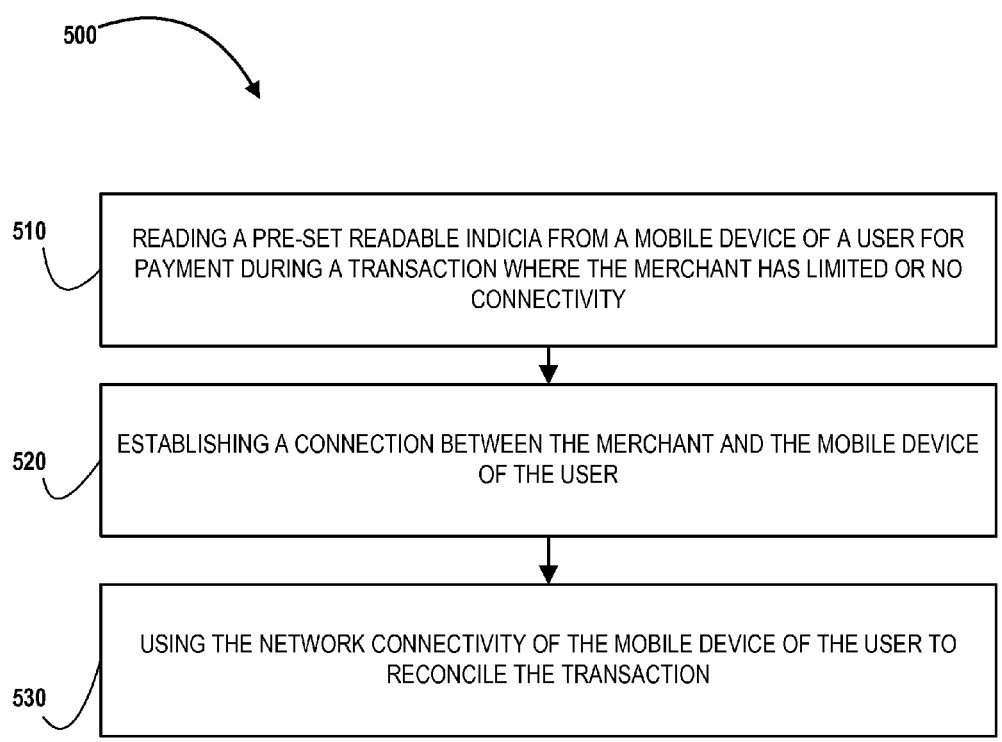

Having thus described embodiments of the invention in general terms, reference will now be made to the accompanying drawings, where:

FIG. 1 is a flowchart illustrating a general process flow for processing a pre-set readable indicia associated with a user in accordance with embodiments of the present invention;

FIG. 2 is a block diagram illustrating technical components of a system for processing a pre-set readable indicia associated with a user in accordance with embodiments of the present invention;

FIG. 3 is a flowchart illustrating a process flow including optional steps for processing a pre-set readable indicia associated with a user in accordance with embodiments of the present invention;

FIG. 4 is a flowchart illustrating a process flow including optional steps for processing a pre-set readable indicia associated with a user; and FIG. 5 is a flowchart illustrating a process flow including optional steps for processing a pre-set readable indicia associated with a user.

DETAILED DESCRIPTION OF EMBODIMENTS OF THE INVENTION

Embodiments of the invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for processing a pre-set readable indicia associated with a user. The invention receives and stores one or more pre-set readable indicia including instructions for providing a payment during a transaction; and presents one or more of the pre-set readable indicia to a merchant during a transaction for payment. In some embodiments, the pre-set readable indicia comprises a one-use payment token for payment during a transaction not to exceed a predetermined payment limit, and in some embodiments, the pre-set readable indicia comprises payment account information and the invention receives authentication credentials from the user and authenticates the user to approve payment using the payment account information from the pre-set readable indicia. A product, as used herein, refers to services and/or goods offered for sale.

As used herein, the readable indicia typically includes a code (e.g., a one dimensional code such as a barcode, a two dimensional code such as a Quick Response (QR) code, etc.). In some embodiments, the readable indicia includes visual indicia, e.g., a barcode, a Quick Response (QR) code, etc. The readable indicia may include any one-dimensional or two-dimensional code. The invention is not limited to the merchant being an insurance entity. In embodiments where the readable indicia is in electronic form, the readable indicia may be dynamically generated after the user selects an option to view the readable indicia (e.g., on the user's portable mobile communication device). The readable indicia may comprise any indicia, visual or non-visual, where information associated with the indicia is receivable or readable (e.g., scannable) by the mobile device. For example, the readable indicia is comprised in a tag (e.g., radio frequency identification (RFID) tag, near field communication (NFC) tag, etc.).

Referring now to FIG. 1, a general process flow 100 is provided for processing a pre-set readable indicia associated with a user.

A user may use a portable mobile communication device or apparatus ("mobile device") that may include an image-capturing component (e.g., a camera) to capture the image of the readable indicia. In some embodiments, image of the readable indicia is stored in the mobile device. In other embodiments, the image of the readable indicia is automatically transmitted to an external server. In some embodiments, a user may bring a mobile device in close proximity to a readable indicia having a tag in order to receive information (e.g., readable indicia) associated with the tag.

At block 110, one or more pre-set readable indicia are generated. The pre-set readable indicia may include instructions for providing payment information during a transaction. The pre-set readable indicia may be generated by a system maintained by a financial institution at which the user has a relationship. For example, a financial institution system may generate pre-set readable indicia to be associated with a user and downloaded by a user using a mobile device. The pre-set readable indicia may be generated to include payment information, such as payment account information associated with an account owned by the user. In some embodiments, the pre-set readable indicia may include authentication credentials that may be verified by the user before the payment account information may be used to perform a transaction. In some embodiments, the pre-set readable indicia may include payment account information that includes instructions for providing account information or other information necessary to make a payment, such as an alias, to the merchant for facilitating completion of the transaction.

At block 120, the pre-set readable indicia may be stored in a mobile wallet of a user's mobile device. In some embodiments, the pre-set readable indicia are generated in response to a user's request, either via mobile device application, website or otherwise and then pushed from the financial institution server to the mobile wallet application of the user's mobile device. In some embodiments, the pre-set readable indicia are downloaded based on the user's request via the mobile wallet, and in some embodiments, the pre-set readable indicia are downloaded periodically or regularly to the user's mobile wallet. In some such embodiments, the pre-set readable indicia are configured to expire at a predetermined time or count down to an expiration. In such instances, the mobile wallet application may be configured to download additional pre-set readable indicia upon expiration or upon a specific amount of time remaining on the pre-set readable indicia before expiration.

At block 130, the pre-set readable indicia are presented to a merchant by the user using his or her mobile device. For example, the user may select the mobile wallet application and chose to may a payment to a merchant using one of the pre-set readable indicia stored in the user's mobile wallet. The mobile wallet application then displays the pre-set readable indicia on its screen so that the user may present the pre-set readable indicia to the merchant for reading and completion of the payment transaction. In some embodiments, such as when the mobile device has limited or no connectivity, the user may choose to use a pre-set readable indicia rather than using other payment vehicles for payment.

The mobile wallet application may recognize that it has no network connectivity and then prompt the user for input as to whether the user desires to use a pre-set readable indicia for making payment to a merchant. The user may then confirm a desire to use the pre-set readable indicia and the mobile device may then display a pre-set readable indicia from the user's mobile wallet as selected by the user. For example, the user may have multiple pre-set readable indicia in the mobile wallet and may select one indicia over another for a variety of reasons such as the indicia being set to expire soon or the indicia being associated with a desired payment account or rewards.

At block 140, the merchant may reconcile the transaction over its network connection using the payment account information provided to the merchant by the pre-set readable indicia. In some embodiments, the pre-set readable indicia may require that the user provide authentication credentials in order for the payment account information to be unlocked and be useable by the merchant to complete the transaction. For example, the merchant may require that the user enter a PIN or other credential at the merchant's point of sale. In other embodiments, the user may enter a PIN or other credential in the mobile device, which establishes a connection with the merchant's point of sale or otherwise and validates the transaction. In some embodiments, before the pre-set readable indicia may be presented to the merchant for payment during a transaction, the user must submit authentication credentials to the mobile device.

Thus, the user may input authentication credentials onto a user interface of the mobile device. In some embodiments, this input may include entering a password. In some embodiments, this input may include entering an alias. For example, the alias may include a phone number, email address, or social networking identification information associated with the user. In other embodiments, this input may include entering an answer to a question. In still other embodiments, this input may include selecting a picture. In some embodiments, the received authentication credentials are stored in the mobile device. In other embodiments, the received authentication credentials are automatically transmitted to an external server. In other embodiments, the user has previously entered any necessary authentication credentials into the mobile device and is therefore considered authenticated without further authentication being necessary. In some instances, some authentication has been performed prior to an attempted transaction and a confirmatory authentication may be required in order to complete a transaction. For example, the user may have already submitted a username and password for partial authentication to occur, but in order to complete a purchase transaction using the mobile device mobile wallet, the user must then enter a PIN to compete authentication.

The authentication credentials may be used to authorize or initiate a payment. In embodiments where the authentication credentials (and/or the readable indicia and/or an image thereof) are stored in the mobile device, the processing of the authentication credentials (and/or the readable indicia and/or an image thereof) occurs in the mobile device. In embodiments where the authentication credentials (and/or the readable indicia and/or an image thereof) are transmitted to an external server, the processing of the authentication credentials occurs outside the mobile device, i.e., at the external server. The processing may include comparing the authentication credentials (and/or information associated with the readable indicia) to information stored in at least one of the mobile device or the external server to determine whether to initiate issuance of a payment associated with the payment claim.

In some embodiments, authentication credentials are included in the readable indicia. During processing, the authentication credentials input by the user may be compared to the authentication credentials extracted from the readable indicia. In other embodiments, the authentication credentials are not included in the readable indicia. In such embodiments, the authentication credentials input by the user are compared to information (e.g., authentication credentials) stored in at least one of the mobile device or external server or accessed by at least one of the mobile device or external server from an external datastore. For example, in some embodiments, the user's mobile wallet has authentication credentials associated with it and stored in the mobile device such that when the user desires to make a transaction, the authentication credentials entered by the user may be compared to the authentication credentials stored in the mobile device.

If the mobile device or the external server determines a match between the authentication credentials input by the user and the authentication credentials either extracted from the readable indicia or stored in at least one of the mobile device or external server, the payment is authorized or initiated for debiting the appropriate account associated with the mobile wallet and crediting the appropriate payment account of the merchant/business selling the product. Therefore, the payment may be automatically transmitted to a payment account (e.g., a pre-selected financial institution account) associated with the merchant/business from the user's payment account. In alternate embodiments, the payment associated with the product is authorized or initiated without executing the authentication step described herein. The user interface of the mobile device may present the link and may prompt the user to visit the link. The link may transport the user to a user interface page for entering authentication credentials. Prior to enabling the user to enter the authentication credentials, one or more mobile interface pages of advertisements may be presented to the user.

In some embodiments, after the user authenticates himself or herself, the payment for the product may be made to an alias that was provided by the readable indicia (as opposed to necessary account/routing numbers). Accordingly, the payment may then be processed by the financial institution managing the merchant/business's receiving account such in order to enhance privacy of the merchant's sensitive information, e.g., account numbers. For example, when the mobile wallet sends the payment to an alias, the financial institution of the merchant receives the payment, interprets the alias, and forwards the payment to the merchant's account. Therefore, the merchant receives the payment without providing the merchant's account information to the user or the user's mobile device.

Similarly, when a payment is being made from the user's mobile wallet, the mobile wallet may provide an alias to the user's financial institution, which may then properly debit an account associated with the alias. In this regard, the user's sensitive information, i.e., account numbers, may remain private.

In some embodiments, the payment may be a payment from a first user to a second user (e.g., a merchant). The first user may present readable indicia on the first user's mobile device or may issue readable indicia to the second user on a physical medium (e.g., paper). The readable indicia may represent a payment of an amount of funds. The second user may receive information associated with the presented readable indicia using the second user's portable mobile communication device.

Referring now to FIG. 2, an exemplary block diagram of the system environment 200 for implementing the process flow 100 described in FIG. 1 (and/or the other process flows described herein) is shown, in accordance with embodiments of the invention. As illustrated, the system environment 200 includes a network 210, a system 230, and a user input system 240. Also shown in FIG. 2 is a user 245 of the user input system 240. The user input system 240 may be a mobile device as described herein. The user 245 may be a person who uses the user input system 240 to execute a user application 247. The system 230 may be the external server described herein. The user application 247 and/or the system application 237 may incorporate one or more parts of the process flow 100 or any other function described herein.

As shown in FIG. 2, the system 230, and the user input system 240 are each operatively and selectively connected to the network 210, which may include one or more separate networks. In addition, the network 210 may include a local area network (LAN), a wide area network (WAN), and/or a global area network (GAN), such as the Internet. The network may also include a mobile telecommunication network. It will also be understood that some or all the network 210 may be secure and/or unsecure and may also include wireless and/or wireline and/or optical interconnection technology.

The user input system 240 may include any computerized apparatus that can be configured to perform any one or more of the functions of the user input system 240 described and/or contemplated herein. For example, the user 245 may use the user input system 240 to transmit and/or receive information or commands to and from the system 230. In some embodiments, for example, the user input system 240 may include a personal computer system, a mobile computing device, a personal digital assistant, a mobile phone, a network device, and/or the like. As illustrated in FIG. 2, in accordance with some embodiments of the present invention, the user input system 240 includes a communication interface 242, a processor 244, a memory 246 having an user application 247 stored therein, and a user interface 249. In such embodiments, the communication interface 242 is operatively and selectively connected to the processor 244, which is operatively and selectively connected to the user interface 249 and the memory 246. In some embodiments, the user 245 may use the user application 247 to execute processes described with respect to the process flows described herein.

Each communication interface described herein, including the communication interface 242, generally includes hardware, and, in some instances, software, that enables the user input system 240, to transport, send, receive, and/or otherwise communicate information to and/or from the communication interface of one or more other systems on the network 210. For example, the communication interface 242 of the user input system 240 may include a wireless transceiver, modem, server, electrical connection, and/or other electronic device that operatively connects the user input system 240 to another system such as the system 230. The wireless transceiver may include a radio circuit to enable wireless transmission and reception of information.

Each processor described herein, including the processor 244, generally includes circuitry for implementing the audio, visual, and/or logic functions of the user input system 240. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 247 of the memory 246 of the user input system 240.

Each memory device described herein, including the memory 246 for storing the user application 247 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 2, the memory 246 includes the user application 247. In some embodiments, the user application 247 includes an interface for communicating with, navigating, controlling, configuring, and/or using the user input system 240. In some embodiments, the user application 247 includes computer-executable program code portions for instructing the processor 244 to perform one or more of the functions of the user application 247 described and/or contemplated herein. In some embodiments, the user application 247 may include and/or use one or more network and/or system communication protocols.

Also shown in FIG. 2 is the user interface 249. In some embodiments, the user interface 249 includes one or more output devices, such as a display and/or speaker, for presenting information to the user 245. In some embodiments, the user interface 249 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 245. In some embodiments, the user interface 249 includes the input and display devices of a mobile device, which are operable to receive and display information.

FIG. 2 also illustrates a system 230, in accordance with an embodiment of the present invention. The system 230 may include any computerized apparatus that can be configured to perform any one or more of the functions of the system 230 described and/or contemplated herein. In accordance with some embodiments, for example, the system 230 may include a computer network, an engine, a platform, a server, a database system, a front end system, a back end system (such as one or more servers maintained by a financial institution), a personal computer system, and/or the like. Therefore, the system 230 may be an external server as described herein. In some embodiments, such as the one illustrated in FIG. 2, the system 230 includes a communication interface 232, a processor 234, and a memory 236, which includes a system application 237 and a datastore 238 stored therein. As shown, the communication interface 232 is operatively and selectively connected to the processor 234, which is operatively and selectively connected to the memory 236.

It will be understood that the system application 237 may be configured to implement any one or more portions of the various user interfaces and/or process flow described herein. The system application 237 may interact with the user application 247. It will also be understood that, in some embodiments, the memory includes other applications. It will also be understood that, in some embodiments, the system application 237 is configured to communicate with the datastore 238, the user input system 240, etc.

It will be further understood that, in some embodiments, the system application 237 includes computer-executable program code portions for instructing the processor 234 to perform any one or more of the functions of the system application 237 described and/or contemplated herein. In some embodiments, the system application 237 may include and/or use one or more network and/or system communication protocols.

In addition to the system application 237, the memory 236 also includes the datastore 238. As used herein, the datastore 238 may be one or more distinct and/or remote datastores. In some embodiments, the datastore 238 is not located within the system and is instead located remotely from the system. In some embodiments, the datastore 238 stores information or data described herein.

It will be understood that the datastore 238 may include any one or more storage devices, including, but not limited to, datastores, databases, and/or any of the other storage devices typically associated with a computer system. It will also be understood that the datastore 238 may store information in any known way, such as, for example, by using one or more computer codes and/or languages, alphanumeric character strings, data sets, figures, tables, charts, links, documents, and/or the like. Further, in some embodiments, the datastore 238 may include information associated with one or more applications, such as, for example, the system application 237. It will also be understood that, in some embodiments, the datastore 238 provides a substantially real-time representation of the information stored therein, so that, for example, when the processor 234 accesses the datastore 238, the information stored therein is current or substantially current.

It will be understood that the embodiment of the system environment illustrated in FIG. 2 is exemplary and that other embodiments may vary. As another example, in some embodiments, the system 230 includes more, less, or different components. As another example, in some embodiments, some or all of the portions of the system environment 200 may be combined into a single portion. Likewise, in some embodiments, some or all of the portions of the system 230 may be separated into two or more distinct portions.

In addition, the various portions of the system environment 200 may be maintained for and/or by the same or separate parties. It will also be understood that the system 230 may include and/or implement any embodiment of the present invention described and/or contemplated herein. For example, in some embodiments, the system 230 is configured to implement any one or more of the embodiments of the process flow 100 described and/or contemplated herein in connection with FIG. 1 or any other process flow described herein. Additionally, the system 230 is configured to initiate presentation of any of the user interfaces described herein. As another example, the system 230 may represent one or more financial institutions and/or one or more financial institution systems and/or servers. In some embodiments, one financial institution communicates with another financial institution across the network 210 and/or some other network or networks, for example, in order to process transactions such as payments for products.

Referring now to FIG. 3, a flowchart illustrates a method 300 including some optional steps that may be performed in addition to and/or in place of some or all the steps of method 100. At block 310, the pre-set readable indicia may expire after a predetermined period of time or may expire at a pre-determined day and time. At block 320 the mobile wallet application may download new pre-set readable indicia for use for payment in transactions. For example, the pre-set readable indicia may be configured to provide payment functionality for a finite period of time. Once the indicia has expired, it may disappear from the user's mobile wallet. The user's mobile wallet may also display information to the user indicating the time remaining for the indicia and/or that that indicia will expire at a specific day/time. In some embodiments, the mobile wallet provides the user an opportunity to download new indicia in preparation for the expiring or to replace expired indicia. In some such embodiments, the new indicia may not be active, that is, it may not be functional to provide payment until a previous indicia has expired. In some instances, the new indicia may be queued by the mobile wallet for download. For example, in a situation where the mobile device has limited or no connectivity and an indicia is set to expire, a new indicia may be queued for download upon the mobile device re-establishing a reliable network connection.

Referring now to FIG. 4, a flowchart illustrates a method 400 including some optional steps that may be performed in addition to and/or in place of some or all the steps of method 100. At block 410, a pre-set readable indicia is read from the mobile device of a user for payment during a transaction. For example, the point of sale of the merchant may include a reading device such as a scanner for scanning the display of the mobile device of the user to capture the readable indicia.

In some instances, the merchant may have limited or no connectivity for reconciling the transaction via the banking network. At block 420, the pre-set readable indicia that was read from the mobile device is stored by the merchant, either at the point of sale or otherwise. At block 430, upon reconnection of the merchant's network connection, the merchant may perform a reconciliation of the transaction based on the information read from the pre-set readable indicia. In this regard, the merchant may delay reconciling the transaction for a short period of time if doing so would cause a backlog given the merchant's connection speed and/or number of transactions to be reconciled or if the merchant is unable to do so due to lack of a network connection, for example. In some situations, the merchant may contract to take on additional liability in order to facilitate delayed reconciliation of the transactions.

Referring now to FIG. 5, a flowchart illustrates a method 500 including some optional steps that may be performed in addition to and/or in place of some or all the steps of method 100. At block 510, a pre-set readable indicia may be read from a mobile device of a user for payment during a transaction where the merchant has limited or no connectivity. At block 520, a connection is established between the merchant and the mobile device of the user, for example, between the point of sale of the merchant and the mobile device. At block 530, using the network connectivity of the mobile device of the user, the merchant may reconcile the transaction. In this regard, the merchant may establish a channel for reconciling the transaction using the mobile device connection. The channel may provide encrypted communications or other security procedures such that the mobile device and/or the mobile device user cannot tamper with the channel or the communication. In some embodiments, the connection between the mobile device and the merchant's point of sale is a hardwired connection and in others, the connection may be a wireless connection.

In various embodiments, the pre-set readable indicia is a one-time use payment token. In other embodiments, the pre-set readable indicia is a payment token that is limited to a predetermined number of uses.

In some embodiments, the merchant may use a mobile device to scan the pre-set readable indicia from the user. The merchant's mobile device may have connectivity and immediately reconcile the transaction or may have no connectivity and may queue the transaction for subsequent reconciliation upon establishing a connection.

In some embodiments, a pre-set readable indicia may be requested by a user as a gift for someone else. The pre-set readable indicia may be restricted to be used only by one or more authorized users. For example, the pre-set readable indicia may be created to include authentication credentials requiring an authorized user to input a password that the creating user provides to the user's contact along with the gift. In some embodiments, the creating user may place a restriction on the types or categories of purchases that may be made using the pre-set readable indicia. For example, a parent may create a pre-set readable indicia for a child that is restricted to grocery store purchases. The restriction may be built into the pre-set readable indicia such that when the merchant reads the indicia, payment is not authorized if purchases are being made outside the predetermined restriction(s).

In summary, embodiments of the invention are directed to systems, methods and computer program products for processing a pre-set readable indicia associated with a user. The invention receives and stores one or more pre-set readable indicia including instructions for providing a payment during a transaction; and presents one or more of the pre-set readable indicia to a merchant during a transaction for payment. In some embodiments, the pre-set readable indicia comprises a one-use payment token for payment during a transaction not to exceed a predetermined payment limit, and in some embodiments, the pre-set readable indicia comprises payment account information and the invention receives authentication credentials from the user and authenticates the user to approve payment using the payment account information from the pre-set readable indicia.

In some instances, embodiments of the invention are directed to systems, methods and computer program products for processing a pre-set readable indicia associated with a user. The invention reads the pre-set readable indicia from a mobile device of the user, where the pre-set readable indicia comprises payment information, stores the read pre-set readable indicia or payment information extracted from the pre-set readable indicia, and, after connecting to a network, reconciles the transaction based on the payment information extracted from the pre-set readable indicia. In some embodiments, the invention receives authentication credentials from the user and authenticates the user to approve payment using the payment information from the pre-set readable indicia.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A merchant apparatus for processing a pre-set readable indicia associated with a user associated with a transaction between the user and a merchant whereby the merchant takes on additional liability for conducting transactions while the merchant apparatus has limited or no connectivity with a transaction authorization network and whereby the merchant apparatus reconciles the transactions after connecting with the transaction authorization network, the apparatus comprising:
    a memory;
    a processor; and
    a computing module stored in the memory, executable by the processor, and configured to cause the processor to:
        determine that the apparatus has limited or no connectivity with a transaction authorization network;
        read the pre-set readable indicia from a mobile device of the user, where the pre-set readable indicia comprises payment information;
        in response to determining that the apparatus has limited or no connectivity, store the read pre-set readable indicia or payment information extracted from the pre-set readable indicia; and
        after connecting to the transaction authorization network, reconcile the transaction based on the payment information extracted from the pre-set readable indicia.

2. The apparatus of claim 1, wherein the readable indicia comprises a Quick Response (QR) code.

3. The apparatus of claim 1, wherein the computing module is further configured to cause the processor to:
    read two or more pre-set readable indicia from a plurality of mobile devices of a plurality of users;
    store the two or more pre-set readable indicia or payment information extracted from the two or more readable indicia; and
    after connecting to the network, reconciling each transaction associated with the two or more pre-set readable indicia based on the time the transaction was initiated.

4. The apparatus of claim 1, wherein the computing module is further configured to cause the processor to:
    establish a connection between the apparatus and a server maintained by a financial institution associated with the payment information; and
    facilitate, via the connection, reconciliation of the transaction with the financial institution.

5. The apparatus of claim 1, wherein the storing is performed in response to determining that a number of transactions being performed reaches a predetermined threshold such that a backlog of transactions waiting for reconciliation may occur.

6. The apparatus of claim 1, wherein the pre-set readable indicia comprises payment information; and wherein the computing module is further configured to cause the processor to:
    receive authentication credentials from the user; and
    authenticate the user to approve payment using the payment information from the pre-set readable indicia.

7. A method for processing a pre-set readable indicia associated with a user associated with a transaction between the user and a merchant, whereby the merchant takes on additional liability for conducting transactions while a merchant apparatus has limited or no connectivity with a transaction authorization network and whereby the merchant apparatus reconciles the transactions after connecting with the transaction authorization network, the method comprising:
    providing a processor of a merchant apparatus, the processor for executing computer program code stored in a non-transitory computer-readable medium to cause the processor to:
        determine that the apparatus has limited or no connectivity with a transaction authorization network;
        read the pre-set readable indicia from a mobile device of the user, where the pre-set readable indicia comprises payment information;
        in response to determining that the apparatus has limited or no connectivity, store the read pre-set readable indicia or payment information extracted from the pre-set readable indicia; and
        after connecting to the transaction authorization network, reconcile the transaction based on the payment information extracted from the pre-set readable indicia.

8. The method of claim 7, wherein the readable indicia comprises a Quick Response (QR) code.

9. The method of claim 7, wherein the computing module is further configured to cause the processor to:
- read two or more pre-set readable indicia from a plurality of mobile devices of a plurality of users;
- store the two or more pre-set readable indicia or payment information extracted from the two or more readable indicia; and
- after connecting to the network, reconciling each transaction associated with the two or more pre-set readable indicia based on the time the transaction was initiated.

10. The method of claim 7, wherein the computing module is further configured to cause the processor to:
- establish a connection between the apparatus and a server maintained by a financial institution associated with the payment information; and
- facilitate, via the connection, reconciliation of the transaction with the financial institution.

11. The method of claim 7, wherein the storing is performed in response to determining that a number of transactions being performed reaches a predetermined threshold such that a backlog of transactions waiting for reconciliation may occur.

12. The method of claim 7, wherein the pre-set readable indicia comprises payment information; and wherein the computer program code is further configured to cause the processor to:
- receive authentication credentials from the user; and
- authenticate the user to approve payment using the payment information from the pre-set readable indicia.

13. A computer program product for processing a pre-set readable indicia associated with a user associated with a transaction between the user and a merchant, whereby the merchant takes on additional liability for conducting transactions while the merchant apparatus has limited or no connectivity with a transaction authorization network and whereby the merchant apparatus reconciles the transactions after connecting with the transaction authorization network, the computer program product comprising:
- a non-transitory computer-readable medium comprising a set of codes for causing a computer to:
  - determine that the apparatus has limited or no connectivity with a transaction authorization network;
  - read the pre-set readable indicia from a mobile device of the user, where the pre-set readable indicia comprises payment information;
  - in response to determining that the apparatus has limited or no connectivity, store the read pre-set readable indicia or payment information extracted from the pre-set readable indicia; and
  - after connecting to the transaction authorization network, reconcile the transaction based on the payment information extracted from the pre-set readable indicia.

14. The computer program product of claim 13, wherein the readable indicia comprises a Quick Response (QR) code.

15. The computer program product of claim 13, wherein the computer program code is further configured to cause the processor to:
- read two or more pre-set readable indicia from a plurality of mobile devices of a plurality of users;
- store the two or more pre-set readable indicia or payment information extracted from the two or more readable indicia; and
- after connecting to the network, reconciling each transaction associated with the two or more pre-set readable indicia based on the time the transaction was initiated.

16. The computer program product of claim 13, wherein the computer program code is further configured to cause the processor to:
- establish a connection between the computer and a server maintained by a financial institution associated with the payment information; and
- facilitate, via the connection, reconciliation of the transaction with the financial institution.

17. The computer program product of claim 13, wherein the storing is performed in response to determining that a number of transactions being performed reaches a predetermined threshold such that a backlog of transactions waiting for reconciliation may occur.

18. The computer program product of claim 13, wherein the pre-set readable indicia comprises payment account information; and wherein the computing module is further configured to:
- cause the processor to receive authentication credentials from the user; and
- authenticate the user to approve payment using the payment information from the pre-set readable indicia.

* * * * *